United States Patent [19]

Turner

[11] 4,272,738
[45] Jun. 9, 1981

[54] PROGRAMMABLE DELAY RESPONSE SHAPE BULK DELAY EXTENDER

[75] Inventor: James F. Turner, Oakton, Va.

[73] Assignee: Convex Corporation, Fairfax, Va.

[21] Appl. No.: 899,936

[22] Filed: Apr. 25, 1978

[51] Int. Cl.³ .......................... H03H 7/03; H04B 3/14
[52] U.S. Cl. .................................. 333/28 R; 328/167; 330/109
[58] Field of Search ...................... 333/28 R; 328/167; 330/107, 109, 294

[56] References Cited

U.S. PATENT DOCUMENTS

| | | | |
|---|---|---|---|
| 3,444,474 | 5/1969 | Borenstein et al. | 333/28 R X |
| 3,733,565 | 5/1973 | Pierret | 333/28 R |
| 3,818,359 | 6/1974 | Hekimian | 333/28 R X |
| 3,883,830 | 5/1975 | Hekimian | 333/28 R |
| 3,946,328 | 3/1976 | Boctor | 328/167 X |

OTHER PUBLICATIONS

Aikens et al., *Cut Butterworth Filter Phase Distortion*, Electronic Design 24, Nov. 22, 1969, pp. 74–77.
Halycom 1112A Technical Data Sheet, Amplitude/-Delay Equalizer, pp. 43, 44.

*Primary Examiner*—Paul L. Gensler
*Attorney, Agent, or Firm*—George R. Douglas, Jr.

[57] ABSTRACT

Programmable or fixed delay response shape bulk delay extender circuit for a line conditioner or equalizer system having a cascade set of all pass sections for processing signals in which said sections introduce for different frequencies a delay of said signals, and programming apparatus for selectively neutralizing such delay introduced therein by one or more of the all pass sections to produce various delay response shapes or to effect a complete bypass of the bulk delay extender.

The programming apparatus is a multi-position rotary switch having both indication mechanism and controlling mechanism selectively neutralizing delay introduced by one or more of the all pass sections to produce various delay response shapes or effecting a complete bypass of the bulk delay extender.

The indication mechanism may include a panel adjacently positioned to the multi-position rotary switch, the panel having data indicative of the effective neutralization of the various selected programs and may also include data indicative of a bypassed or non-bypassed condition of the bulk delay extender.

24 Claims, 7 Drawing Figures

PROGRAMMABLE DELAY RESPONSE SHAPE BULK DELAY EXTENDER

CROSS-REFERENCE TO PRIOR ART DISCLOSURES

The present invention is a new invention over such prior art devices and disclosures as found in issued U.S. Pat. Nos. including:

| SHINODA | 3,654,495 |
| POPICK | 3,930,209 |
| OHKAWA | 3,950,711 |
| HEKIMIAN | 3,883,830 |

These patents relate to no more than the general field of transmission of pulses and pulse forming circuits. Shinoda discloses a transistor circuit to impose a straight time delay on an incoming pulse, and relates to systems for nonlinear pulse or switching devices. Popick is of interest in showing simulation of various impairments known to exist on transmission lines, including the impairment of envelope delay distortion.

The present invention is different in at least several respects.

First of all, it is a linear device. Secondly, "delay" in the present invention refers to so called "group" or "envelope delay". Envelope delay is defined as the first derivative with respect to radian frequency of the phase response (envelope delay $$T(W) = \frac{d\phi(W)}{dW}).$$

The circuit technology and processing is different in that the invention circuit utilizes integrated operational amplifiers.

The similarity between Popick and the invention fails in that both provide various envelope delay responses on a switched basis in the voice frequency range, but purposes, construction and results of these devices, however, are quite different. The purpose of the invention is to correct the envelope delay response with an inverted shape of that transmission line.

The Popick construction of the delay/amplitude circuit further differs from the invention delay circuit as follows:

(1) The Popick circuit uses six (6) sections of the type of sections shown in FIG. 3A of Popick. The invention circuit uses eight (8) sections of the type shown in FIG. 1; and (2) Each Popick Section uses four (4) operational amplifiers and numerous field effect transistor switches. Each of the invention Sections uses two (2) operational amplifiers and six (6) or seven (7) resistors to achieve the results described below.

Both the Popick and the invention devices (by coincidence only) afford four (4) fixed envelope delay "programs". The use of these devices are for different purposes. The complexity of the Popick circuit serves, in some respect, to illustrate the efficiency of the invention bulk delay. The invention circuit has simple section construction, efficient, unique switching means and unique indicating means.

FIELD OF THE INVENTION

The present invention relates to data line conditioner apparatus that has included therein an on-board programmable delay response shape bulk delay extender or a fixed bulk delay extender that corrects delay and amplitude responses of communication circuits used for transmission of data. More particularly the invention relates to a bulk delay circuit as an intergal part of a data line equalizer. A data line equalizer is used on telephone voice channels to condition the channel for transmission of high speed data. The function of the equalizer is to correct the amplitude vs frequency and delay vs frequency responses of the channel. The equalizer has a number of delay and amplitude controls effective across the spectrum of the voice channel that enable the selected corrections to be made.

BACKGROUND OF THE INVENTION

Prior art devices and systems are found to use forms of all pass type sections to (1) provide a bulk delay characteristic and to provide amplitude correction, or (2) provide a single fixed bulk delay characteristic.

The present invention directed to the programmable enablement seeks to provide an advantage over prior art systems having single fixed bulk delay response shape in that greater range, flexibility and quality of delay response correction is attained and is programmed with an accomplished ease and facility not seen provided in the prior art.

The present invention also seeks to provide an advantage over the prior art systems in that the bulk delay can be taken out without disabling the amplitude correction circuitry.

A bulk delay circuit according to the invention provides gross delay correction to the channel while in general making no correction to the amplitude response. Use of these circuits in an equalizer provides two main advantages. First of all the delay correction capability of the equalizer is extended; secondly, the magnitude of the ripple in the delay response is reduced.

Figure 1:
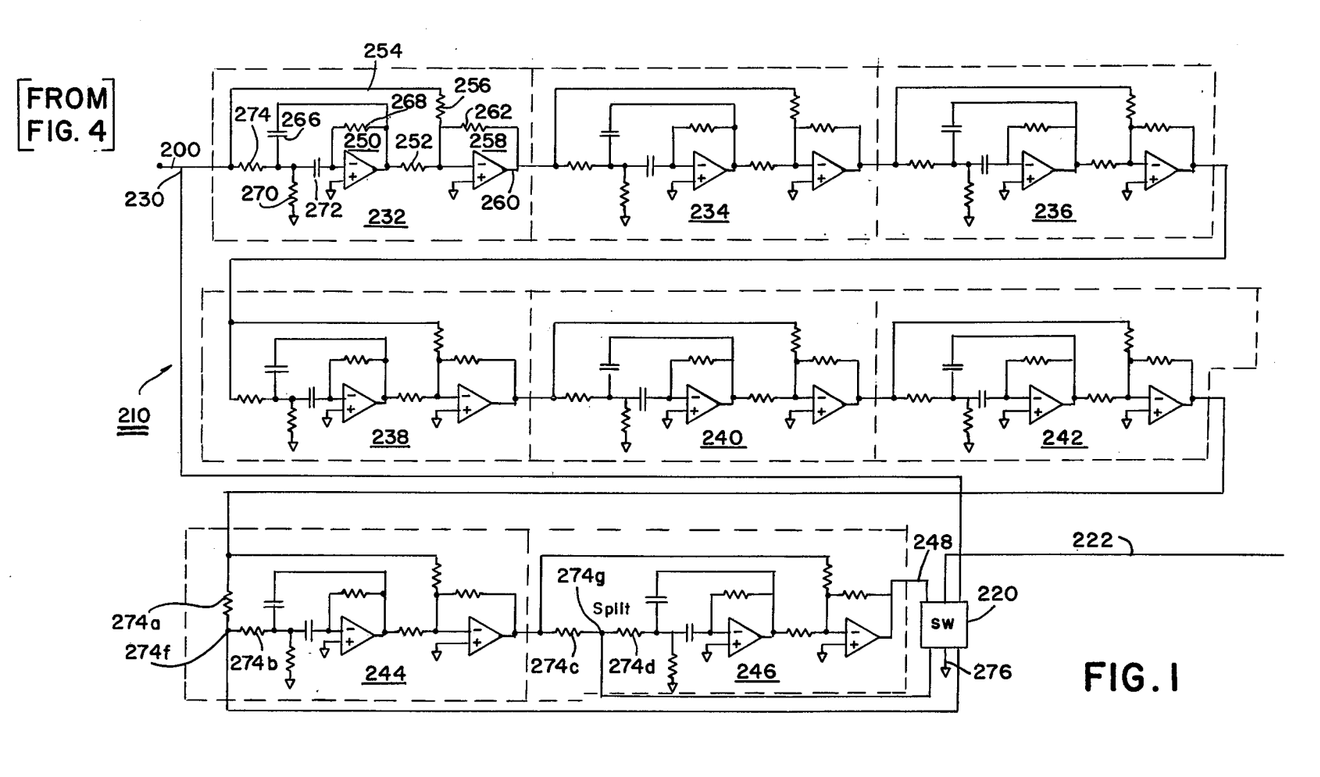
FIG. 1 is a schematic diagram of a preferred embodiment of a programmable delay response shape bulk delay equalizer according to a best mode of the invention for use in systems such as shown in FIG. 3.

Described as a circuit, a bulk delay circuit of the invention may be made by cascading a number of second order "all pass" sections (as shown in FIG. 1). Each "all pass" section has a transfer characteristic $$\frac{Vo}{Vi} = \left[\frac{s^2 - As + Wn^2}{s^2 + As + Wn^2}\right].$$

SUMMARY OF THE INVENTION

An object, feature and advantage of the invention is to provide multi-sections of bulk delay comprising all pass sections having defined transfer characteristics such that there is provided:

(a) A very simple means of selectively disabling up to two (2) of a plurality of all pass sections;

(b) A bypass of the entire bulk delay circuit;

(c) Programmable bulk delay produced with small number of components and related to indicia disposed on panel structures;

(d) A new equalizer having means to programmably disable individual all pass sections;

(e) Use of capacitors in "bump" type all pass sections connected across a feedback element so that when a delay is set to maximum it feeds back more signal than would ordinarily be fed back, so it, in effect, is an adaptive correction for the amplitude vs delay interaction of controls;

(f) Use of so-called "boost" type all pass sections, one at the low frequency end and one at the high frequency end, and having use of a capacitor across a feedback element that improves interaction between the amplitude (AMP) and shape (Q) controls such as to enable adjustment of the Q control and have the amplitude at the center frequency of the section remain where it is set;

(g) A "bump" type all pass section that uses a two digit or two sixteen position switch amplitude control having a greater range and greater resolution, specifically a range of plus or minus 5 db vs plus or minus 3 db; of the prior art the resolution is in 1/10 db steps vs 2/10 db steps of the prior art; of the two, the resolution is the more important thing, more so than the range, but the range is a saliant feature;

(h) A boost section having a significant improvement in that we have two digits or two sixteen position switch Q control, sometimes known as shape control, to give much better resolution. Competitive equipment only has one digit of control; and (i) A programmable bulk delay incorporated in the common, small modular unit.

BRIEF DESCRIPTION OF THE SEVERAL VIEWS OF THE DRAWING

The above and other objects and advantages of the invention will become apparent upon full consideration of the following detailed description and accompanying drawings in which.

DETAILED DESCRIPTION OF THE PREFERRED EMBODIMENT OF THE INVENTION

Figure 3:
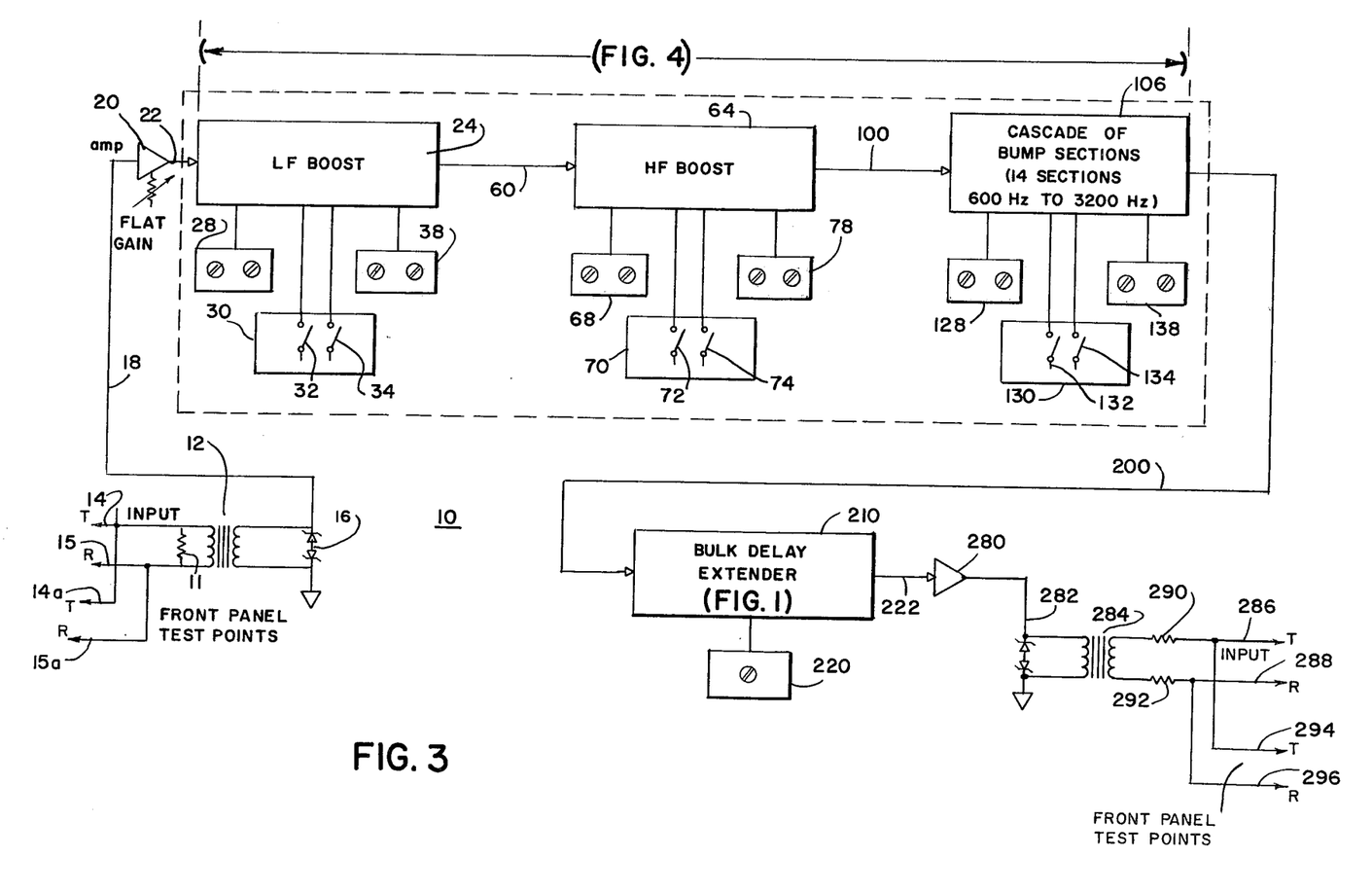
FIG. 3 is a block diagram, a portion of which is shown in schematic, showing an embodiment of an amplitude and delay equalizer according to the invention.

Referring now to the drawings there is shown an amplitude and delay equalizer system 10 of FIG. 3 having an input transformer network 12 to which are applied at the input terminals 14, 15 a data signal comprising tone signals in the audio or voice frequency range or spectrum. An example of such data is non-human voice audio signals for communicating information such as computer signals over telephone lines and the like where a need exists for processing the signals by line conditioning or equalization of amplitude and delay characteristics of the line. Resistor 11 may provide impedance matching to the input terminals 14, 15. Also shown are node terminals 14a, 15a for front panel test points.

The signals pass the transformer network 12 for converting the balanced input to a single-ended input for passing over line 18 and further processing. Diodes 16 provide protection from input transients for the electronic processing circuitry and stages to follow.

Line 18 passes the input signal to amplifier 20 which is a flat-gain amplifier. A flat-gain amplifier is one in which all frequencies in the band, the voice band for example, are amplified or attenuated equally throughout the band. From the output of amplifier 20 the signal is passed over line 22 to a low frequency boost section 24 serving to amplify or attenuate signals that occur or fall within the low frequency range of the band or voice band. See FIGS. 3 and 4.

Figure 2:
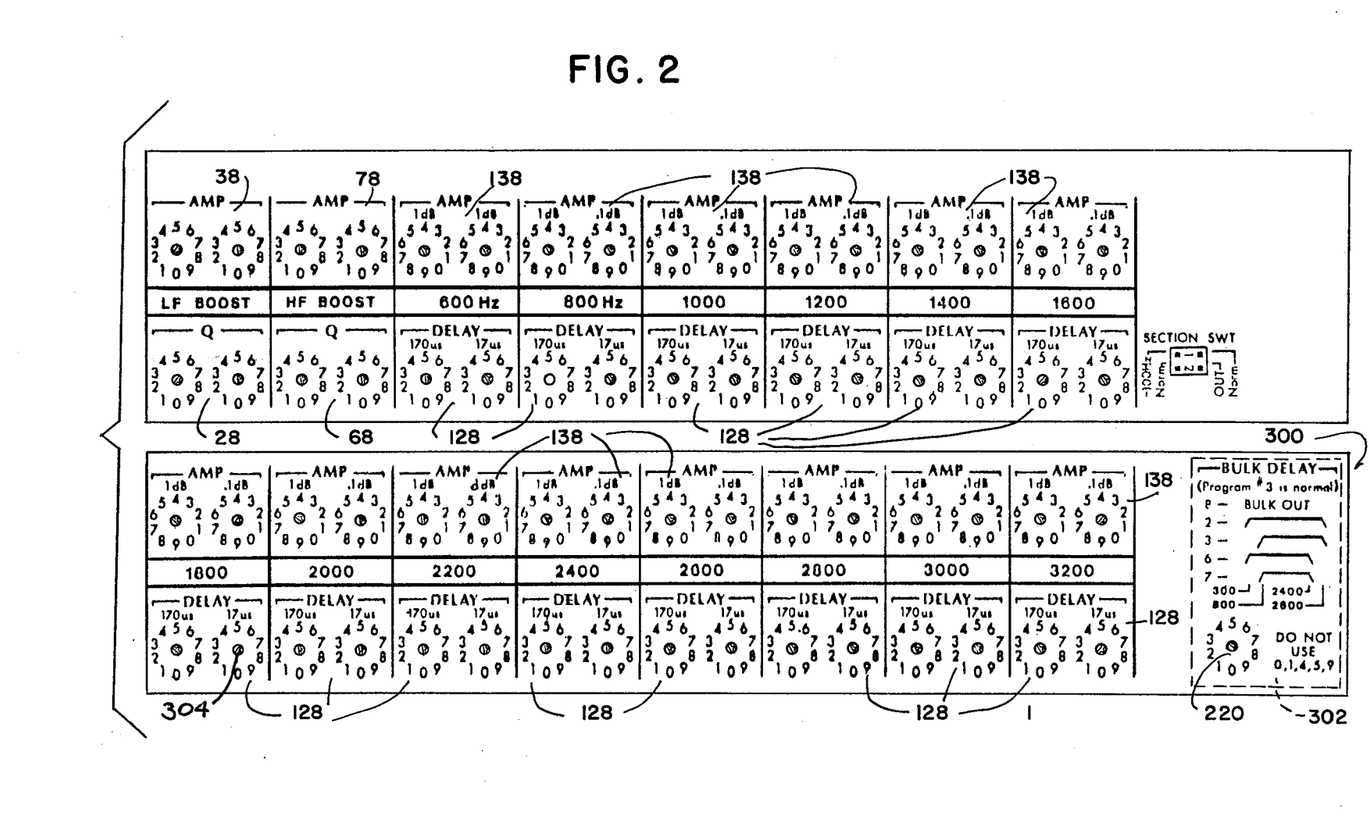
FIG. 2 is an elevation view of groups of two digit switches mounted behind an interior control panel mounted generally adjacent a bulk delay programming rotary swtich, said panel having means to indicate the various selected programs or a bypassed condition of the bulk delay extender of systems such as shown in FIG. 3.
Figure 2A:
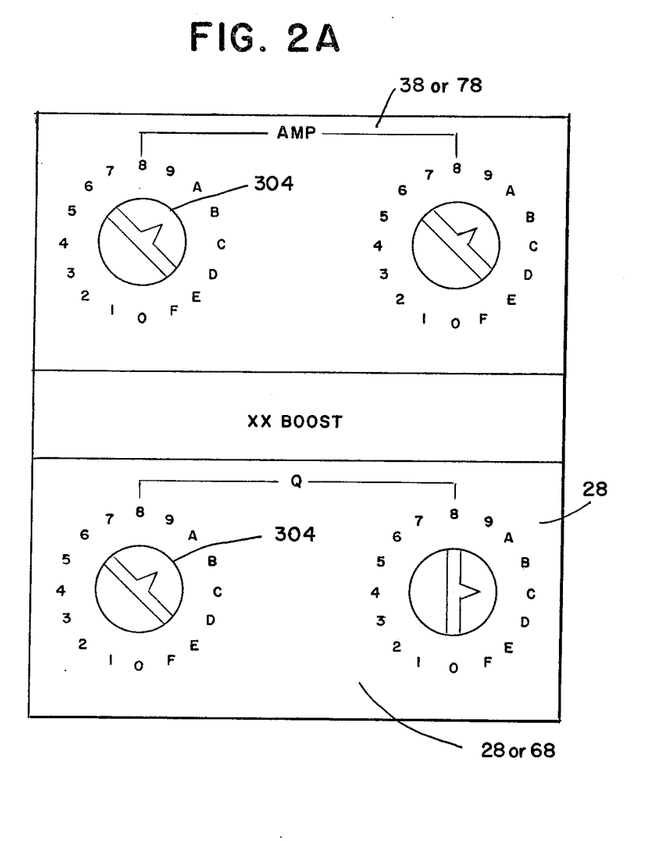
FIGS. 2A and 2B is a modification of FIG. 2 illustratively showing alternate arrangements of groups of two sixteen position switches.
Figure 5:
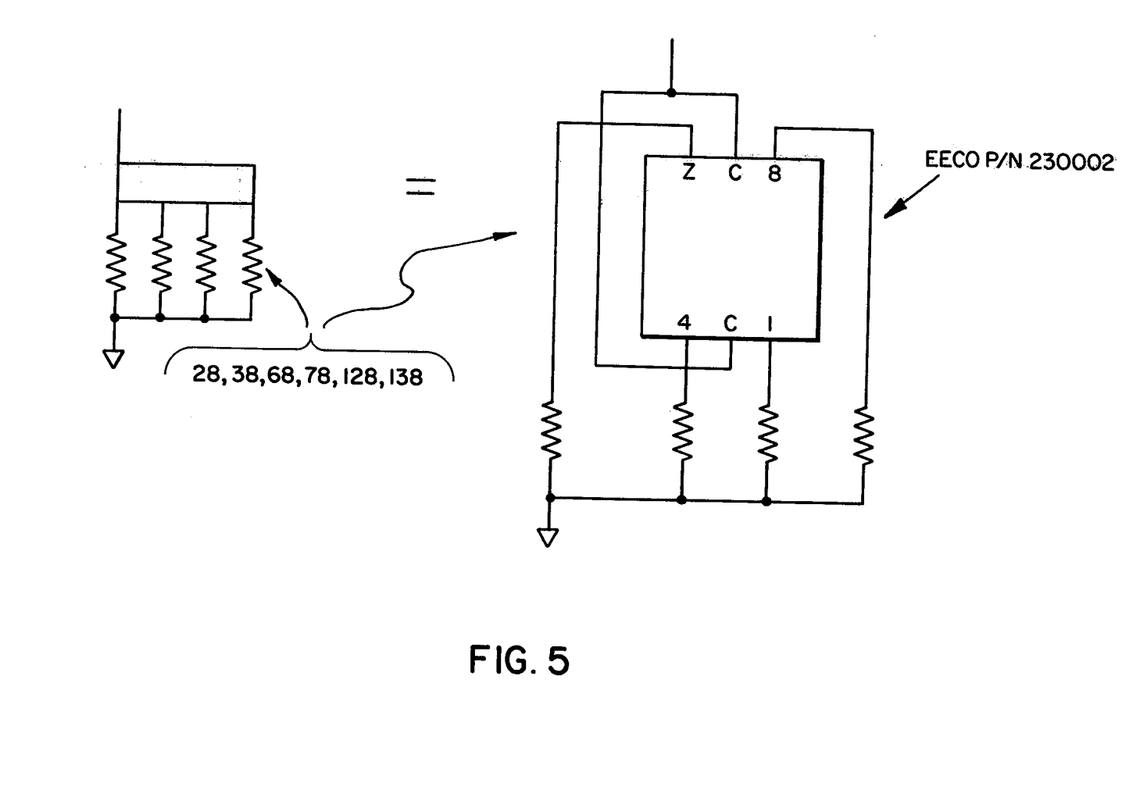
FIG. 5 is a legend depicting controls 28, 38, 68, 78, 128, 138.

The legend of FIG. 5 is a detailed illustration of controls 28, 38, 68, 78, 128, 138. The controls consist of pairs of micro-dip coded dual-in-line switches used to selectively connect commons C, C to one or more or all four resistors shown in the legend. In operation the commons C, C may selectively be connected to:

none of the remaining terminals or to; 1; 2; 2 and 1; 4; 4 and 1; 4 and 2; 4 and 2 and 1; 8; 8 and 1; respectively constituting ten states of control. A Q control 28 having two digit, boost Q control as shown in FIG. 2 and FIG. 5 or two sixteen position switch boost Q control as shown illustratively in FIG. 2A, provides a variable shape to the corrective amplitude response introduced by the low frequency boost section 24; a two-pole section switch 30 provides the functions of (1) by use of opening switch 32, shifting the center or effective frequency of the low frequency or boost section 24 downwardly about 50 Hz, or (2) by use of closing switch 34 effects switching the section out of circuit effecting a bypass.

As further shown in FIGS. 2, 2A, 3, and 5 there is a two digit or two sixteen position switch amplitude control 38 providing amplification or attenuation of signals with frequencies in the low frequency portion of the voice band processed by system 10. The input on line 22 goes by way of line 40 to a summing amplifier 42 and also proceeds through resistor 44 to amplifier stages 46, 48, 50 comprising a band pass filter or device having a variable Q controlled by adjustment of the "LF BOOST Q" control 28.

Figure 4:
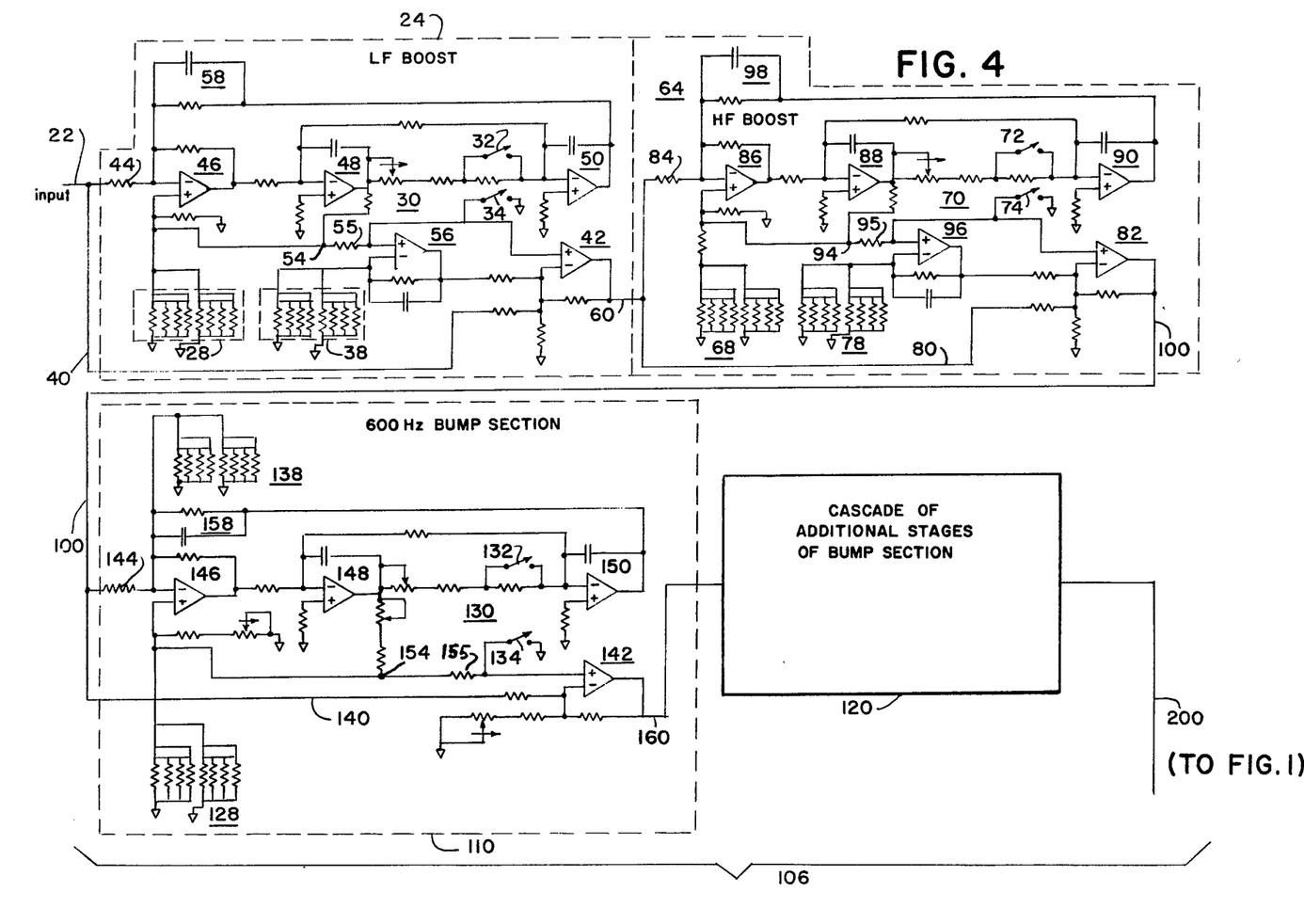
FIG. 4 is a schematic diagram of a system having a "low frequency boost" type all pass section, a "high frequency boost" type all pass section, and multiple stages of so-called "bump" type all pass sections used to correct amplitude and delay according to a best mode of the invention

The output of the band pass device 46, 48, 50 is taken at node 54 for applying to an amplifier network 56 the gain of which is adjusted by the two digit or two sixteen position switch amplitude control 38. The output of amplifier network 56 and the input signal on line 40 are applied for summing to the summing amplifier 42 along with the output of the band pass filter at node 54 applied through resistor 55 and the summed or composite signal thereof is an output provided on line 60 for further processing.

The band pass device 46, 48, 50 has a feedback path 58 through an R-C network as shown providing a path connecting the output of a subsequent operational amplifier to the input of the operational amplifier.

Basically the output of the low frequency boost section 24 at line 60 is an amplified or attenuated and shaped/amplitude response effecting applied input signals falling in the low frequency portion of the voice band.

Continuing with FIGS. 3 and 4 the connected response on line 60 is applied to a high frequency boost section 64 serving to amplify or attenuate signals that occur or fall within the high frequency range of the band.

A Q control or two digit or two sixteen position switch "HF BOOST Q" control 68 (FIG. 5) provides a variable shape to the corrective amplitude response introduced by the high frequency boost section 64; a two pole section switch 70 provides the functions of (1) by use of opening switch 72 shifting the center or effective frequency of the high frequency boost section 64 downwardly about 100 Hz, or (2) by use of closing switch 74 effects switching the section out of circuit effecting a bypass.

A two digit or two sixteen position switch amplitude control 78 (FIG. 5) adjusts amplification or attenuation of signals falling in the high frequency portion of the voice band processed by system 10. The input on line 60 goes by way of line 80 to a summing amplifier 82 and also proceeds through resistor 84 to amplifier stages 86, 88, 90 comprising a band pass filter or device having a variable Q controlled by adjustment of the "HF BOOST Q" control 68. The attenuated output of the band pass device 86, 88, 90 is taken at node 94 for applying to an amplifier network 96 the gain of which is adjusted by the two digit or two sixteen position switch amplitude control 78. The output of amplifier network 96 and the input signal on line 80 are applied for summing to the summing amplifier 82 along with the output of the band pass filter at node 94 applied through resistor 95 and the summed or composite signal thereof is an output provided on line 100 for further processing.

The band pass device 86, 88, 90 has a feedback path 98 through an R-C network as shown providing a path connecting the output of a subsequent operational amplifier to the input of the operational amplifier.

Returning to FIG. 3 the high frequency boost section output 100 is applied to cascade 106 of programmable all pass or "bump" sections 110, 120 (shown in FIG. 4) for processing signals in which delay of the signals is introduced. The cascade 106 of bump type all pass sections may comprise 14 sections for processing signals in which the sections introduce delay of the applied signals; each section has switching and controlling to effect the amplitude and delay of the applied signal.

A delay control 128 (FIG. 5) provides delay of applied signals falling at or in the vicinity of a center or effective frequency of the section. A section switch 130 provides the functions of (1) by use of opening switch 132 shifting the center frequency of the section downwardly about 100 Hz, or (2) by use of closing switch 134 effects switching the section out of circuit effecting a bypass.

A two digit or two sixteen position switch amplitude control 138 provides amplification or attenuation of applied signals falling at or in the vicinity of a center frequency of the section. The first section 110 of the cascade 106 of bump type all pass sections obtains its input from line 100. The input on line 100 goes by way of line 140 to a summing amplifier 142 and also proceeds through resistor 144 to amplifier stages 146, 148, 150 comprising a band pass filter or device whose attenuated output is derived from node 154 for summing to the summing network 142 by way of a resistor 155.

The band pass device 146, 148, 150 of each bump section 110, 120 has a feedback path 158 through an R-C network as shown provides a path connecting the output of a subsequent operational amplifier to an input of a previous operational amplifier.

The output line 160 of amplifier 142 is the output of section 110 and connects to a cascade of additional stages of bump type all pass sections each of which corrects amplitude and delay of input signals whose frequencies fall at or in the vicinity of a center or effective frequency of the respective sections comprising cascade 120.

Sections 120 are identical essentially to section 110 but having different center frequencies at selected various strategic points in the voice spectrum as shown in FIG. 2 and the final output of cascade 120 is on line 200.

Figure 2B:
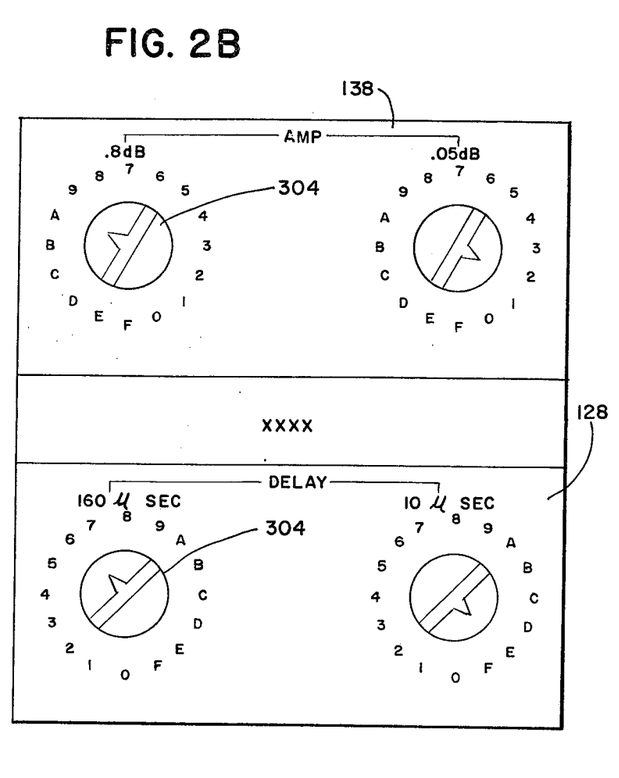

Switch 220 is a multi-position rotary switch having both indication means and means for neutralizing delay as introduced in one or more of the all pass sections that are cascaded to form bulk delay extender 210, and it has the dual functions of providing (1) selective delay response programming of the bulk delay extender 210 and (2) an inout bypass characteristic of the entire bulk delay extender. It is unique in that it is a high density device in view of the flexibility that it provides in its various functions and in providing single, simple control. The switch 220 may be such as the MICRO-DIP series 2300 manufactured by EEC), 1441 East Chestnut Avenue, Santa Ana, Calif. 92701. These switches 220 and including those shown in FIGS. 2, 2A and 2B and elements 28, 38, 68, 78, 128, 138 of FIG. 3 are such as those shown and described in U.S. Pat. No. 4,107,482 to Marker assigned to Electronic Engineering Co. of California, (EECO) which was filed Jan. 31, 1977 and was granted Aug. 15, 1978; the disclosure of Marker is incorporated herein by reference under M.P.E.P. 608.01 (p), and particularly showing a ten position switch used as a one pole binary code, which may be a BCD 1-2-4-8, or the same with complement only.

The signal on line 200 is applied to the input node 230 of the bulk delay extender 210 which comprises a set of cascaded all pass sections 232, 234, 236, 238, 240, 242, 244, 246. The output of all pass section 246 is connected to switch 220 by line 248.

All pass section 232, as well as each of 234, 236, 238, 240, 242, 244, 246 are each essentially a band pass filter 250 comprising an operational amplifier with associated circuitry whose output is summed through a resistor 252 with the signal from the input of each section as an example in the case of section 232 from node 230 over line 254 and resistor 256. The summing amplifier 258 from each of the given inputs produces an output at node 260 which includes a feedback path through resistor 262.

All pass section 244 has its resistor 274 essentially split to form resistive attenuation network having resistors 274a, 274b; and all pass section 246 has its resistor 274 essentially split to form a resistive attenuation network having resistors 274c, 274d. The intermediate point or nodes 274f and 274g are connected respectively to two of six nodes or terminals of switch 220; the other four nodes being connected to an input junction 230 of a first all pass section; to an output of a second operational amplifier of a final all pass stage 246, and one is the output terminal, one node of switch connected to ground 276.

Line 222 is shown connected to an output amplifier 280 (FIG. 3) that provides a flat gain of all frequencies falling in the voice band and whose output is at line 282 and provides input drive for output transformer 284.

Single-ended to balanced conversion provided by transformer 284 drives a load (not shown) connected on terminals 286, 288.

Resistors 290, 292 may provide impedance matching to the connected terminals 286, 288. Also shown are nodes 294, 296 for front panel test points.

FIG. 2 shows indicia 302 on a panel 300 adjacently positioned to the multi-position rotary switch 220 and said indicia is data indicative of effective neutralization that provides various selected available delay response programs and indicative of a bypassed or non-bypassed condition of the sub system bulk delay extender 210.

It is to understood that elements 24, 64, 106 and 210 can be cascaded in various orders and sequence, not being limited by the given arrangement of the sequence as shown.

The controls 28, 38, 68, 78, 128, 138 are multiposition switches each having ten or more positions and in the preferred embodiments described above, the switches have, for example ten (10) or sixteen (16) positions; while other numbers of positions may be selected and used, it is found that ten or sixteen switch positions are optimum and preferred. This includes an arrangement where control 28, for example, may have a pair of 16 position switches, and control 38, for example, may have a pair of 10 position switches, or vice versa.

Each of controls 28, 38, 68, 78, 128, 138 are disposed for ease in mechanical control, switching and adjustment and are constructed for such mechanical adjustment by having a slotted member 304 for rotation about its axis; it is provided with a detent type arrangement (not shown) of a conventional structure for locking or securing the position in place after the adjustment has been made.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. A line conditioner or equalizer to produce various delay response shapes or effect a complete bypass of a programmable bulk delay extender comprising
    a cascade of all pass sections including a first all pass section and a final all pass section, each of said all pass sections having an input junction, an output junction, band pass filter and summing amplifier means for processing signals in which said sections introduce delay of said signals,
    said band pass filter including an operational amplifier having a positive input terminal connected to ground, a negative input terminal and an output terminal, a resistor connected between the output terminal and the negative input terminal of the operational amplifier, a capacitor connected between a junction point and said negative input terminal, a second capacitor connected between said junction point and said output terminal, two of said all pass sections having a resistor network comprising two resistors in series respectively connected between said junction point and the input junction of said respective all pass section,
    said summing amplifier means comprising of a further operational amplifier with a negative input terminal, a positive input terminal connected to ground and an output terminal connected to said output junction, a single resistor connected between the output terminal and the negative input terminal of said further operational amplifier,
    a summing resistive network comprising a first resistor connected between the negative input terminal of said further operational amplifier and the input junction of said respective all pass section and a second resistor connected between the negative input terminal of said further operational amplifier and the output terminal of said operational amplifier of said band pass filter,
    and switching means including a single multi-position rotary switch having six (6) terminals, one being connected to ground; two being respectively connected to an intermediate node of the two resistor network of said two all pass sections; one being connected to said input junction of said first all pass section for effecting a complete bypass of said bulk delay extender; one being connected to the output junction of said final all pass section; and one being a common output terminal,
    said switching means selectively neutralizing delay introduced by one or two sections of the cascade of all pass sections thereby effecting a programmable delay response shape, bulk delay extender.

2. The invention according to claim 1 wherein the switching means includes a single control means for selecting one of several delay response shape programs or effecting a complete bypass of said bulk delay extender (220 of FIG. 1).

3. The invention according to claim 1 wherein said multi-position rotary switch has indication means including a panel adjacently positioned to the multi-position rotary switch, said panel having data indicative of the shape of the various delay response programs and of the effective neutralization of the various selected programs and indicative of a bypassed or nonbypassed condition (302 of FIG. 2).

4. The invention according to claim 1 wherein said resistive network is an attenuation means for neutralizing the delay of one of said all pass sections (274a, b, f and 274c, d, g of FIG. 1).

5. The invention according to claim 1 wherein said switching means has indication means including a panel adjacently positioned to the multi-position rotary switch, said panel having data indicative of the selected delay response of the programmable bulk delay extender as controlled by the multi-position rotary switch.

6. The invention according to claim 1 wherein equalization circuit means for conditioning a line is connected as a stage of said cascade (FIG. 3).

7. The invention according to claim 6 wherein said equalization circuit means includes plural operational amplifiers and resistor-capacitor feedback means providing a path connecting an output of a subsequent operational amplifier to an input of a previous operational amplifier (58, 98, 158 of FIG. 4).

8. The invention according to claim 1 wherein there is provided a further cascade of programmable all pass sections for processing signals in which said sections introduce delay of said signals, said further cascade being connected in series with said bulk delay extender and said further cascade having means controlling amplitude and delay of said signals, said controlling means having two switches each having at least ten positions that adjust said amplitude of the signal and two further switches each having at least ten positions that adjust the delay of the signal (106 of FIG. 3; 128, 138 of FIG. 4).

9. The invention according to claim 8 wherein said controlling means comprises sixteen (16) resistive elements each selectively connected to adjust amplitude and delay in the processing of said signals (128, 138 of FIG. 4).

10. The invention according to claim 8 wherein said controlling means provides 1/10 dB steps resolution for adjustment of amplitude in the processing of said signals.

11. The invention according to claim 8 wherein said controlling means provides 1/20 dB steps resolution for adjustment of amplitude in the processing of said signals.

12. The invention according to claim 8 wherein said controlling means provides 10 microsecond steps resolutions in the processing of said signals for adjustment of delay.

13. The invention according to claim 8 wherein said controlling means are multi-position rotary switches having both indication means and controlling means to adjust amplitude and delay in the processing of said signals. (128, 138 of FIG. 2 and FIG. 4).

14. The invention according to claim 13 wherein said indication means includes a panel adjacently positioned to the multi-position rotary switches, said panel having data indicative of increments of delay and amplitude and effective frequency of said all pass section (FIG. 2).

15. The invention according to claim 13 wherein said indication means includes a panel adjacently positioned to the multi-position rotary switches, said panel having data indicative of the selected steps of the multi-position rotary switches (FIG. 2).

16. The invention according to claim 1 wherein said switching means are sets of multi-position rotary switches having both indication and control means (128, 138 of FIG. 2).

17. The invention according to claim 16 wherein said indication means includes a panel adjacently positioned to the multi-position rotary switches; said panel having data indicative of increments of delay and amplitude and effective frequency of said all pass section (FIG. 2).

18. The invention according to claim 16 wherein said controlling means provides 1/10 dB steps resolution for adjustment of amplitude in the processing of said signals.

19. The invention according to claim 16 wherein said controlling means provides 1/20 dB steps resolution for adjustment of amplitude in the processing of said signals.

20. The invention according to claim 16 wherein said controlling means provides 10 microsecond steps resolution in the processing of said signals for adjustment of delay.

21. The invention according to claim 1 wherein there is provided a further cascade of programmable all pass sections for processing signals connected in series with said bulk delay extender in which said further cascade provide an adjustable amplitude response that adjusts gain or attenuation (LF BOOST, HF BOOST) of said sections, said sections each having controlling means having two switches each having at least ten positions that adjust a magnitude of said response (AMP) and further two switches each having at least ten positions that adjust the shape of the response (Q) (28, 38, 68, 78 of FIG. 4).

22. The invention according to claim 21 wherein said controlling means comprises sixteen (16) resistive elements each selectively connected to adjust magnitude and shape of said amplitude response in the processing of said signals (28, 38, 68, 78 of FIG. 4).

23. The invention according to claim 21 wherein said switches are sets of multi-position rotary switches having both indication and control means (28, 38, 68, 78 of FIG. 3 and FIG. 4).

24. The invention according to claim 23 wherein said indication means includes a panel adjacently positioned to the multi-position rotary switches, said panel having data indicative of the selected steps of the multi-position rotary switches (FIG. 2).

* * * * *